(12) United States Patent
Renz (10) Patent No.: US 6,939,395 B2
(45) Date of Patent: Sep. 6, 2005

(54) ADSORBER FOR CLEANING RAW GASES, FILTER MODULE COMPRISING SUCH AN ADSORBER, FILTER UNIT COMPRISING AT LEAST TWO SUCH FILTER MODULES, AND DEVICE FOR CONDITIONING OUTER AIR OR FOR TREATMENT OF ESCAPING AIR WITH SUCH FILTER MODULES

(75) Inventor: Manfred Renz, Ditzingen (DE)

(73) Assignee: M+W Zander Facility Engineering GmbH, Stuttgart (DE)

( * ) Notice: Subject to any disclaimer, the term of this patent is extended or adjusted under 35 U.S.C. 154(b) by 0 days.

(21) Appl. No.: 10/248,139

(22) Filed: Dec. 20, 2002

(65) Prior Publication Data

US 2003/0136266 A1 Jul. 24, 2003

(30) Foreign Application Priority Data

Dec. 21, 2001 (DE) .......................................... 101 64 461

(51) Int. Cl.⁷ ............................................. B01D 53/04
(52) U.S. Cl. ............................ 96/130; 96/126; 96/133; 96/136; 96/143; 96/154
(58) Field of Search ............................... 96/66, 98, 112, 96/126–136, 139–146, 154; 55/520, 521, 527, 528

(56) References Cited

U.S. PATENT DOCUMENTS

| | | | | |
|---|---|---|---|---|
| 3,577,705 A | * | 5/1971 | Sharlit ............................... 95/2 |
| 3,850,785 A | * | 11/1974 | McQuade et al. .............. 442/2 |
| 3,883,328 A | * | 5/1975 | Spain ............................... 96/66 |
| 3,944,403 A | * | 3/1976 | Simpson et al. .............. 96/131 |
| 4,046,525 A | | 9/1977 | Matsuo et al. .................. 55/59 |
| 4,181,513 A | * | 1/1980 | Fukuda et al. ................ 96/153 |
| 4,217,386 A | * | 8/1980 | Arons et al. ................. 428/198 |
| 4,234,326 A | * | 11/1980 | Bailey et al. .................. 96/154 |
| 4,565,727 A | * | 1/1986 | Giglia et al. ................. 428/172 |
| 4,938,869 A | * | 7/1990 | Bayerlein et al. ........... 210/437 |
| 5,110,561 A | * | 5/1992 | Hitachi et al. ............... 422/180 |
| 5,122,270 A | * | 6/1992 | Ruger et al. ................. 210/282 |
| 5,444,029 A | | 8/1995 | Martin ......................... 502/38 |
| 5,772,738 A | * | 6/1998 | Muraoka ..................... 96/129 |
| 5,827,355 A | * | 10/1998 | Wilson et al. ................ 95/114 |
| 5,912,423 A | * | 6/1999 | Doughty et al. .............. 95/107 |
| 5,912,424 A | * | 6/1999 | Judkins et al. ................ 95/143 |
| 5,925,168 A | * | 7/1999 | Judkins et al. ................ 95/27 |
| 5,972,253 A | * | 10/1999 | Kimber ..................... 264/29.7 |
| 5,976,471 A | * | 11/1999 | Simandl et al. ............. 422/122 |
| 5,980,612 A | * | 11/1999 | Kelly .......................... 95/106 |
| 5,980,616 A | * | 11/1999 | Johnson et al. .............. 96/135 |
| 6,068,771 A | * | 5/2000 | McDermott et al. ... 210/321.83 |
| 6,197,097 B1 | | 3/2001 | Ertl et al. ..................... 96/143 |
| 6,364,936 B1 | * | 4/2002 | Rood et al. ................... 95/115 |
| 6,454,834 B1 | * | 9/2002 | Livingstone et al. .......... 95/11 |
| 6,497,754 B2 | * | 12/2002 | Joannou ....................... 96/67 |
| 2002/0088346 A1 | * | 7/2002 | Baracchi et al. ............. 96/134 |

FOREIGN PATENT DOCUMENTS

| | | |
|---|---|---|
| DE | 41 04 513 | 8/1991 |
| DE | 196 13 326 | 10/1998 |
| DE | 198 28 593 | 10/1999 |
| WO | WO 88/06093 A1 * | 8/1988 |

\* cited by examiner

Primary Examiner—Robert H. Spitzer
(74) Attorney, Agent, or Firm—Gudrun E. Huckett (57) ABSTRACT

An adsorber for cleaning raw gas has at least one filter element wherein the at least one filter element is made of electrically conducting adsorber material. A filter module has a module housing in which such an adsorber is arranged. The housing has at least one inlet opening for the raw gas entering the filter module and at least one outlet opening for the clean gas exiting the filter module. A first ventilation damper unit closes the inlet opening as needed and a second ventilation damper unit closes the outlet opening as needed for performing regeneration and adsorption phases.

22 Claims, 11 Drawing Sheets

ADSORBER FOR CLEANING RAW GASES, FILTER MODULE COMPRISING SUCH AN ADSORBER, FILTER UNIT COMPRISING AT LEAST TWO SUCH FILTER MODULES, AND DEVICE FOR CONDITIONING OUTER AIR OR FOR TREATMENT OF ESCAPING AIR WITH SUCH FILTER MODULES

BACKGROUND OF INVENTION

1. Field of the Invention

The invention relates to an adsorber comprising at least one filter element for cleaning raw gases. The invention further relates to a filter module comprising such an adsorber and a housing having at least one inlet opening for the raw gas and at least one outlet opening for the clean gas.

The invention further relates to a filter unit comprising at least two filter modules. The invention also relates to a device for conditioning outer air which comprises a filter module and has at least one outer air device having arranged downstream thereof at least one filter module with at least one filter element. The invention further relates to a device for treating escaping air with such a filter module.

2. Description of the Related Art

In the treatment of raw gases it is known to guide the raw gas through filter elements which retain undesirable components.

SUMMARY OF INVENTION

It is an object of the present invention to configure the adsorber, the filter module, the filter unit, and the devices of the aforementioned kind such that the raw gas can be optimally cleaned in a simple way.

In accordance with the present invention, this is achieved in regard to the adsorber in that the filter element is comprised of electrically conducting adsorber material.

In accordance with the present invention this is achieved in regard to the filter module in that the adsorber according to the invention is arranged in the housing and that the inlet opening for the raw gas can be closed off by a ventilation damper unit.

In accordance with the present invention this is furthermore achieved in regard to the filter unit in that the filter modules can be switched individually to a regeneration phase.

In accordance with the present invention this is also achieved in regard to the device for conditioning outer air in that the filter element is comprised of electrically conducting adsorber material.

In accordance with the present invention this is furthermore achieved in regard to the device for further treatment of air in that the filter element is comprised of electrically conducting adsorber material.

The filter material of the adsorber is comprised of an electrically conducting adsorber material. By means of the electrically conducting adsorber material the undesirable components contained in the raw gas can be retained in a simple way. The electrically conducting adsorber material moreover can also be regenerated in a simple way in that regeneration air must only be passed in a reverse flow direction through the adsorber material.

The adsorber material is advantageously in the form of ACF (activated carbon fiber) filters which can be electrically regenerated and are comprised of woven or nonwoven material of activated carbon fiber. When the raw gas passes through this adsorber the contaminants are retained and can be removed in a regeneration process. For a faster and safer as well as controlled regeneration, the adsorber material is electrically heated by means of control-technological processes and flushing or regenerating gas is passed therethrough. The adsorber according to the invention can be used in venting device for conditioning outer air and for treating solvent-containing or odor-laden escaping air.

DETAILED DESCRIPTION

Figure 1:
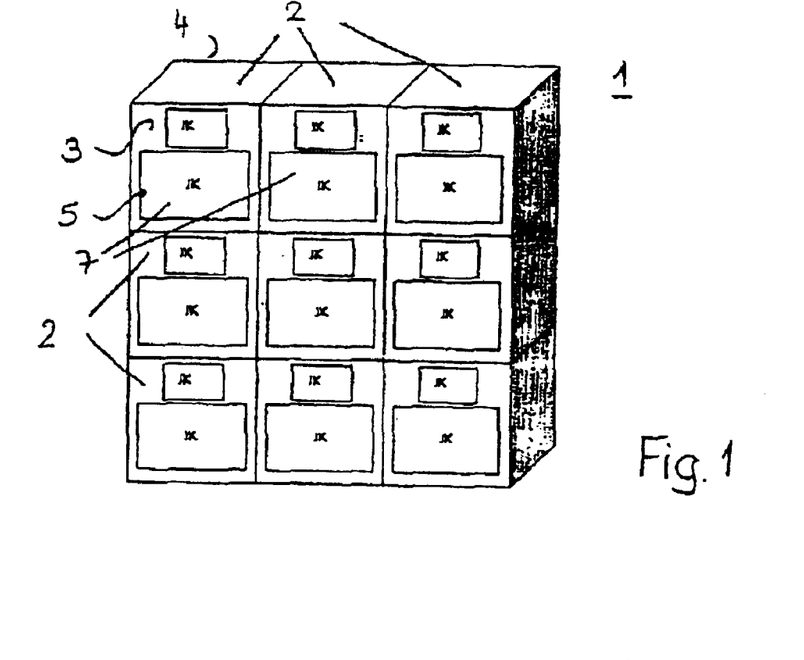
FIG. 1 is a schematic illustration of a filter unit according to the invention with filter modules according to the invention.

FIG. 1 shows in an exemplary fashion the filter unit 1 of a device for treating escaping air or outer air. The filter unit is comprised in the illustrated embodiment of nine modules 2 which are advantageously identical in regard to configuration and size. The number of modules used within one filter unit 1 depends on the required volume flow in each particular application.

Figures 5, 6, 7, 8, 9, 10:
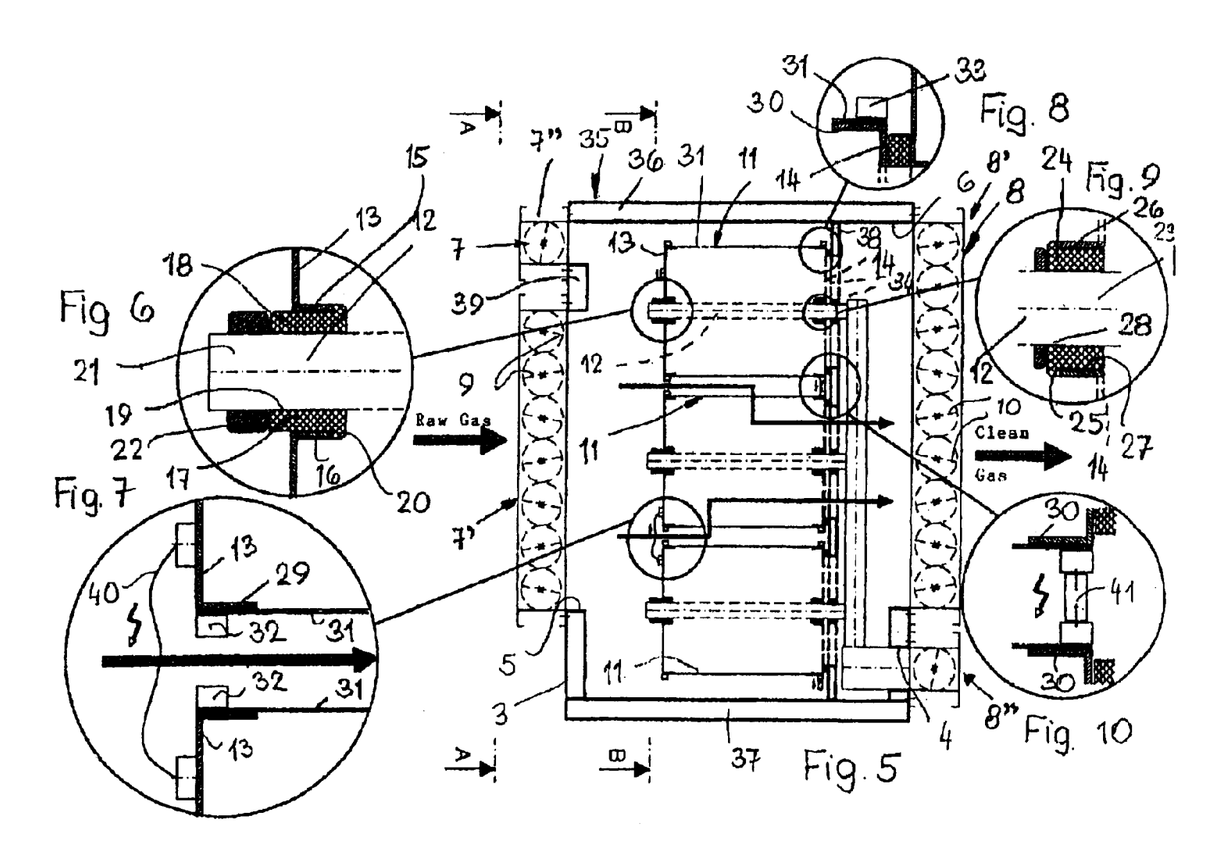
FIG. 5 is a schematic illustration of a section of the filter module according to the invention.
FIG. 6 shows a first detail of the filter module according to FIG. 5.
FIG. 7 shows a second detail of the filter module according to FIG. 5.
FIG. 8 shows a third detail of the filter module according to Fig. 5.
FIG. 9 shows a fourth detail of the filter module according to Fig. 5.
FIG. 10 shows a fifth detail of the filter module according to FIG. 5.

Each module 2 has on its front side 3 as well as on its back side 4 at least one inlet opening 5 and one outlet opening 5

(FIG. 5). Ventilation dampers units 7, 8 with parallel extending ventilation dampers 9, 10 are arranged on the inlet and outlet openings 5, 6. The dampers 9, 10 are opened and closed by means of servo motors (not illustrated). The ventilation dampers 9, 10 enable a venting-technological separation of the filter modules 2 from the total airflow of the filter unit 1.

Within each module 2 a number of cartridges 11 are provided (FIGS. 2 and 5) wherein the number of cartridges depends on the quantity of the airflow. As can be seen in FIGS. 5 through 10, the cartridge 11 has a shaft 12 which is formed by a pipe. In the area between two bottoms or disks 13, 14 connected to the shaft 12 the pipe is perforated. The two bottoms 13, 14 form terminal lids of the cartridge 11. The terminal lids, as illustrated for the lid 13 in FIG. 6, have a central opening 15 whose rim 16 is bent inwardly at a right angle and serves for receiving an annular seal 17. It is comprised of a thermally resistant and electrically non-conducting material and has an inner thread 18 so that the annular seal 17 can be threaded onto the outer thread 19 of the end of the shaft 12. The annular seal 17 projects past the peripheral rim 15 of the bottom 13 and has an annular flange which projects past this rim 15 radially inwardly. The angled rim 16 of the bottom 13 rests sealingly against the flange. The end 21 of the shaft 12 projecting past the annular seal 17 receives a lock nut 22 which rests against the annular seal 17.

Onto the opposite end 23 of the shaft 12 (FIG. 9) the same type of annular seal 24 is threaded which engages with its annular flange 25 the radially inwardly projecting rim 26 of a through opening 27 for the shaft 12. The rim 26 surrounds the central through opening 27 provided centrally in the bottom 14. For axially securing the annular seal 24, a securing ring 28 is positioned on the shaft 12.

The angled outer edge 29, 30 (FIGS. 7, 8) of the two bottoms 13, 14 is bent at a right angle so that a peripheral ring is formed providing a support onto which the woven ACF material 31 or the nonwoven ACF material can be wound. The edges 29, 30 aligned with one another are provided with clamping mandrels (not shown) for this woven or nonwoven material 31. It can be wound in several layers onto the angled edges 29, 30. In the area of the edges 29, 30 a clamping ring 32, 33 is provided on the wound woven (or nonwoven) material 31 with which the woven/nonwoven material 31 is clamped against the outer side of the edges 29, 30. By means of the annular seals 20, 24 threaded onto the ends 21, 23 of the shaft 12, the spacing between the two bottoms 13, 14 can be changed and, in this way, the woven or nonwoven material 31 can be tensioned in the axial direction.

In the illustrated and described embodiment, the outer envelope of the cartridge 11 is formed by the woven/nonwoven ACF material 31. It is also possible to wind the woven or nonwoven ACF material 31 onto a cylindrical carrier which is comprised of electrically nonconducting air-permeable material. For such a carrier, for example, glass silk fabric can be used. This carrier is fastened in the same way on the angled outer edges 29, 30 of the bottoms 13, 14 as the woven or nonwoven ACF material 31.

The bottom 13 of the cartridge 11 facing the ventilation damper unit 7 is closed while the oppositely positioned bottom 14 has through openings 34 for the filtered air. This bottom 14 can be embodied, for example, in the form of a spoked wheel.

The module 2 has a parallelepipedal housing 35 which can be comprised, for example, of metal. In the module housing 35, depending on the quantity of the airflow, one or several cartridges 11 are arranged adjacent and parallel to one another. In the illustrated embodiment, one row comprises three cartridges 11 arranged at a spacing on top of another. Additional cartridges are positioned at a spacing adjacent to the cartridge row illustrated in FIG. 5. All cartridges 11 have the described configuration.

Neighboring cartridges 11 of one row, as illustrated in FIG. 7, are connected electrically in series. The connection is realized by electrically conducting bottoms 13 of the adjacently positioned cartridges 11. Since the cartridges 11 are electrically connected in series, the electrical resistance of the cartridges 11 is increased and the current is reduced. The control of the voltage is realized by a power supply (not illustrated) which advantageously has a controllable three-phase current supply The bottom 37 and the cover 36 of the module housing 35 can be of a double-wall construction. The front wall 3 and the back wall 4 can also be of a double-wall construction.

As illustrated in FIG. 5, the terminal lid or disk 14 of the cartridges 11 are fastened on a partition 38 which extends between the bottom 37 and the cover 36. It has through openings for the clean air passing through the terminal lid 14.

The ventilation damper unit 7 is comprised of two parts 7' and 7". The part 7" is positioned adjacent to the housing cover 36 and has only a single ventilation damper 10. The other part 7' is comprised of several parallel ventilation dampers 10 arranged on top of one another. Both parts 7' and 7" are separated from one another by a partition 39 of the front wall 3 of the module housing 35.

The ventilation damper unit 8 on the backside 4 of the module housing 35 is also comprised of two parts 8' and 8". In the illustrated embodiment they are of identical construction as the parts 7', 7" of the ventilation damper unit 7 but are displaced by 180 degrees relative to them. The ventilation dampers 9, 10 of all parts 7', 7" and 8', 8" are positioned parallel to one another.

The cartridges 11 arranged above and adjacent to one another comprise the adsorption-active filter material 31 which, as a result of the described configuration of the cartridges 11, can be mounted easily and in any desired number of layers.

With the aid of FIG. 2, the adsorption principle of the cartridge filter 11 will be explained in more detail.

On a phase boundary, for example, a gas/solid boundary, an increased concentration of one of the phases can result, for example, of the gas phase. This is referred to as adsorption. A determining factor is the boundary surface of the two phases. When no chemical reaction is triggered during adsorption, this is referred to as physical adsorption which releases at least the amount of heat energy corresponding to the condensation energy. For separating gases and vapors from moist air, carbon is particularly well suited because it is unpolarized due to its electron configuration. The strength of adsorption depends on the physical properties of the material to be adsorbed. Hydrogen, oxygen, nitrogen are not adsorbed at normal temperature (room temperature) so that carbon can be used as a filter medium because it will not become laden with accidentally adsorbed materials.

In the activated carbon fiber (ACF) filtration with woven or non woven material of activated carbon fiber, between the adsorption phase and the desorption phase a differentiation must be made. In the adsorption phase the filter cartridge is loaded while in the desorption phase it is discharged. During the loading process (adsorption), the gas to be cleaned, the so-called raw gas, is passed through the cartridge 11 and cleaned by passing through it.

Figure 2:
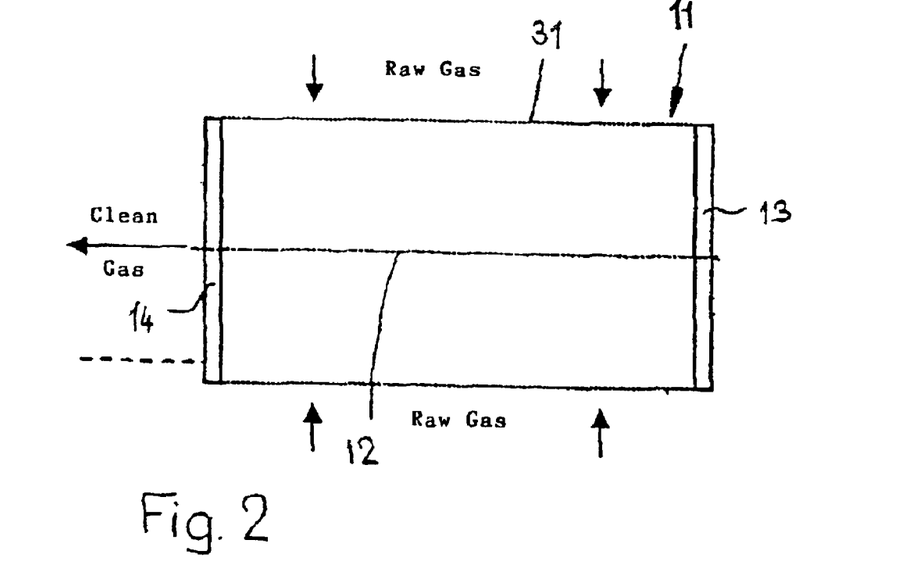
FIG. 2 is a schematic illustration of an adsorber according to the invention in an adsorption phase.

FIG. 2 shows the flow direction of the raw gas which first flows in the radial direction from the exterior onto the woven or nonwoven ACF material 31 and then passes through this woven or nonwoven material. In the illustrated embodiment the raw gas flows radially from the exterior to the interior. Upon passing through the woven or nonwoven ACF material 31, the unwanted components are retained. Within the cartridge 11 the raw gas then flows in the axial direction and exits from the bottom 14 of the cartridge 11 in the form of clean gas. The oppositely positioned bottom 13 of the cartridge 11 is embodied to be air-tight so that it is ensured that the gas passing through the woven or nonwoven material 31 to the interior of the cartridge 11 will exit exclusively via the openings in the bottom 14. The woven or nonwoven ACF material 31 can be wound in five to 15 layers in the described way onto the angled outer edges 29, 30 of the bottoms 13, 14.

During the adsorption process the adsorbed substances will accumulate within the activated carbon fiber material 31. The layer which is facing the incoming air is more strongly loaded then the layers of the ACF material 31 arranged deeper toward the interior in the flow direction.

Figure 3:
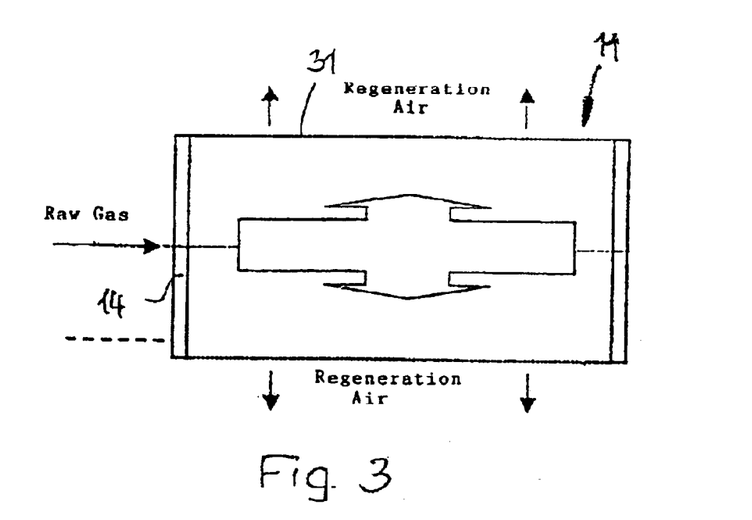
FIG. 3 shows in an illustration corresponding to FIG. 2 the adsorber according to the invention in a regeneration phase.

After a certain duration, at the latest upon reaching the permissible or preset break-through point (this is the concentration value of the clean air), the adsorption operation is switched to desorption operation. The ventilation dampers 9, 10 of the ventilation damper units 7, 8 are switched in such a way, to be described in more detail in the following, that a regeneration airflow will flow through the woven or nonwoven ACF material 31 in the reverse direction (FIG. 3). The desorption air quantity can be much smaller with respect to the adsorbed amount. During the desorption process, the ACF material 31 is heated with electric current. For this purpose, electrical connectors are provided on the opposed bottoms 13, 14 of the cartridge 11 wherein the stacked cartridges advantageously are connected by an electrical connection 40 at their bottoms 13 (FIG. 7).

Also, the bottoms 14 of neighboring cartridges are connected electrically by connection 41 (FIG. 10). The current flows in the longitudinal direction of the cartridges 11 exclusively through the electrically conducting fibers of the ACF material 31. The current is controlled such that the fibers of the woven or nonwoven fabric 31 are heated to the desired desorption temperature, for example, 200 degrees centigrade. Moreover, the current is adjusted such that the concentration in the desorption air flow will not surpass desired values, for example, 25% of the lower explosibility limit. Advantageously, the desorption airflow is switched on only when the material 31 has reached a certain temperature.

FIG. 3 shows the cartridges 11 during the desorption phase where, in comparison to the adsorption phase according to FIG. 2, the gas flows in the reverse flow direction. The gas enters through the openings in the bottom 14 axially the cartridge 11, then flows in the radial direction and, after passing through the ACF material 31, exits radially. The gases which have been adsorbed in the adsorption phase in the material 31 are successively released again and are then supplied as escaping air into the environment or are subjected to a further treatment step.

Since the desorption of the woven or nonwoven ACF material 31 can be performed with a significantly reduced volume flow in comparison to the adsorption phase, the devices or methods downstream thereof for further treatment can be operated more economically. The limit of concentration for flammable substances is determined by the lower explosibility limit. In devices for treating escaping air, values up to 20 times this value can be typically reached.

In the case of outer air devices, as a result of the usually reduced input concentration, substantially higher concentration factors, for example, 200 times, can be reached.

For the treatment of escaping air, an initial concentration of the raw gas in the lower ppm range is assumed. The initial concentration of the raw gas after passing through the filter unit 1 must fulfill the environmental regulations. The degree of separation of the cartridges. 11 within the filter unit 1 is realized by the number of windings of the nonwoven or woven ACF material 31.

The adsorption and desorption or regeneration of the cartridges 11 are controlled by the air-tight ventilation dampers 9, 10 of the ventilation damper units 7, 8 which are provided at the inlet and outlet openings 5, 6 of the filter modules 2.

FIG. 4 shows schematically as a matrix the regeneration of the filter unit 1 at different points in time. The filter unit 1 has, for example, nine modules 2 which are stacked and arranged in three rows (3×3 matrix). At the point $t_1$ (FIG. 4a) the first module RG is regenerated while the cartridges of the remaining filter modules are in the adsorption phase.

At a later point in time $t_2$ (FIG. 4b) the ventilation dampers are switched in a way which will be described in the following such that the second module is switched to a desorption or regeneration phase. The remaining modules remain in the adsorption cycle.

Figure 4A:
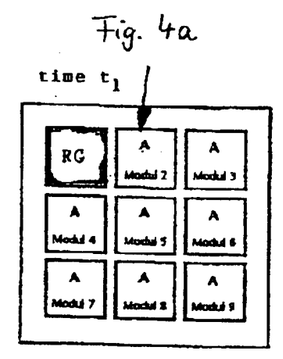
FIGS. 4a to 4e schematically illustrate a regeneration matrix of the filter unit according to the invention showing the regeneration course over time (steps $t_1$ to $t_9$ for modules 1 through 9).
Figure 4B:
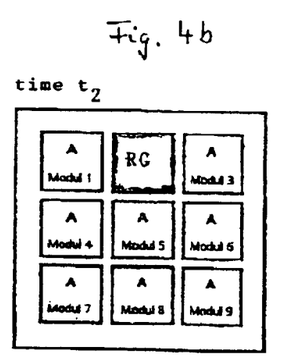
Figure 4C:
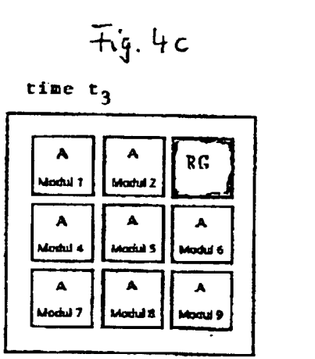

Accordingly, in FIG. 4c at a point in time $t_3$ the third module is switched to the regeneration phase while the cartridges of the other modules are in the adsorption phase.

Figure 4D:
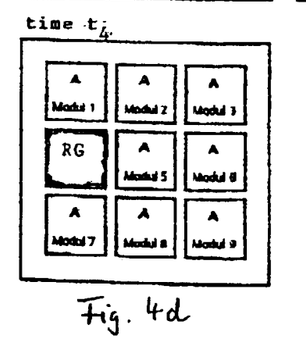

At the point in time $t_4$(FIG. 4d) the fourth module is switched to the regeneration phase. In this way, sequentially the individual modules can be switched to the regeneration phase while the other modules remain in the adsorption phase.

Figure 4E:
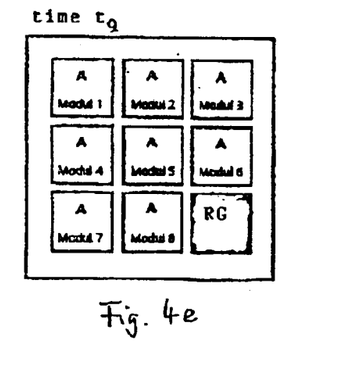

FIG. 4e shows the last stage at the point in time $t_9$ in which the ninth module has been switched to the regeneration phase.

The switching of the individual modules into the regeneration phase is realized advantageously as a function of the exhaust gas amount to be treated and the exhaust gas concentration in a cyclical way. During the regeneration phase, a filter module 2 is separated from the raw gas flow in the described way and, after reaching the required operating temperature of, for example, 200 degrees centigrade, is cleaned by a flow of flushing air, as described in connection with FIG. 3. The laden regeneration air flow, which is, for example, only 1/20 to 1/200 of the raw air flow, is conveyed via Its own pipe network into the environment.

Figure 15:
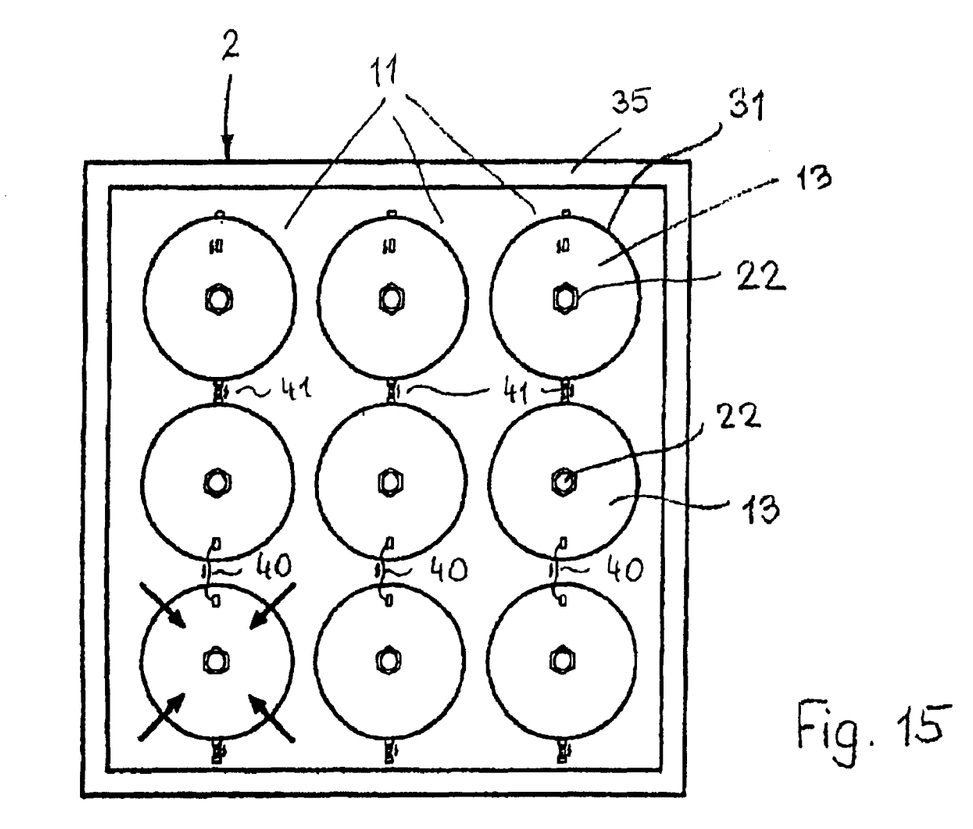
FIG. 15 shows an end view of adsorbers arranged in the filter module during the adsorption process.

In order to be able to operate with conventional voltages and advantageous geometric dimensions, several cartridges 11 in the module 2 are electrically connected in series and distributed uniformly onto three phases of the current supply. An advantageous arrangement with three groups of cartridges 11, switched electrically in series, respectively, and arranged in a filter module 2, respectively, is shown in FIG. 15. Three rows of adjacently positioned and stacked cartridges 11 are shown in an end view. They have a circular contour and are connected by electrical connections 40, 41 with one another. In the illustrated embodiment the stacked cartridges 11 are connected electrically conductingly.

For the lower left cartridge it is illustrated by means of arrows how the raw gas enters radially the cartridge 11. In the case of the other cartridges of the filter module 2, the raw gas to be cleaned also enters radially inwardly. The raw gas flows through the woven or nonwoven ACF material 31, and, in the described way, the unwanted components of the raw gas are retained in the material 31.

Figure 16:
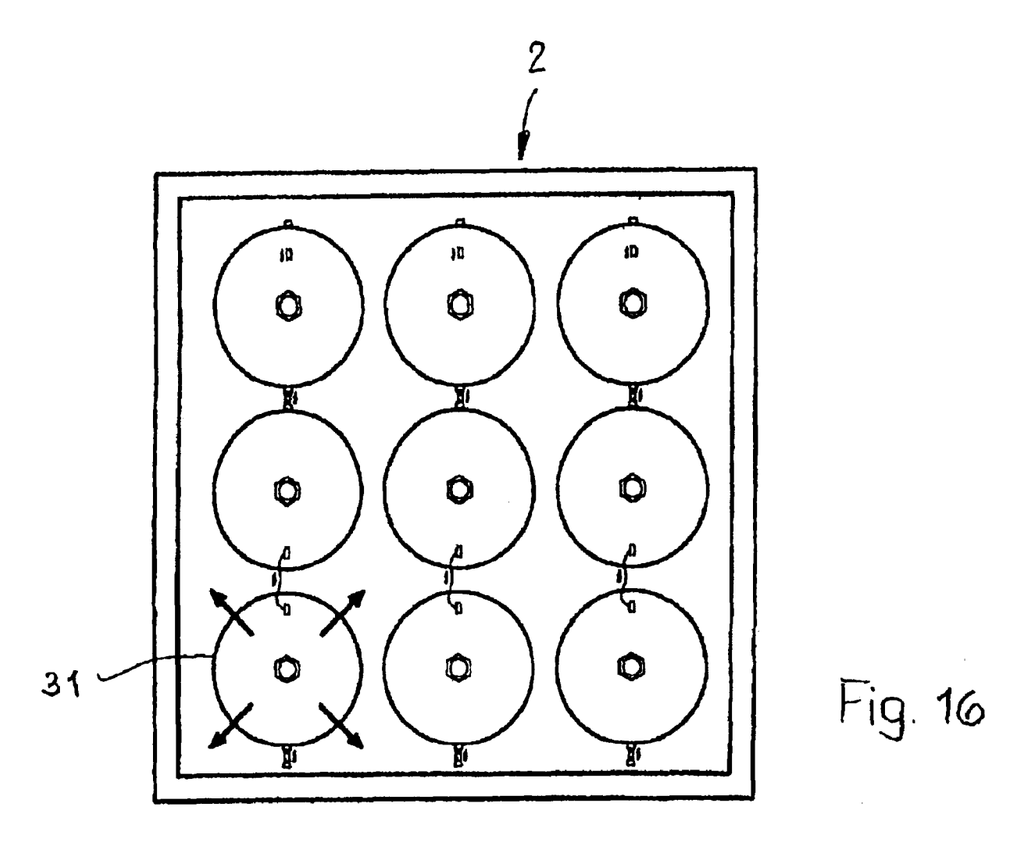
FIG. 16 shows in an illustration corresponding to FIG. 15 the adsorber in the desorption phase.

FIG. 16 shows the situation in which the filter module 2 has been switched to the desorption phase. In this case, the gas flows in the reverse direction, in the illustrated embodiment radially outwardly through the ACF material 31.

Figure 17:
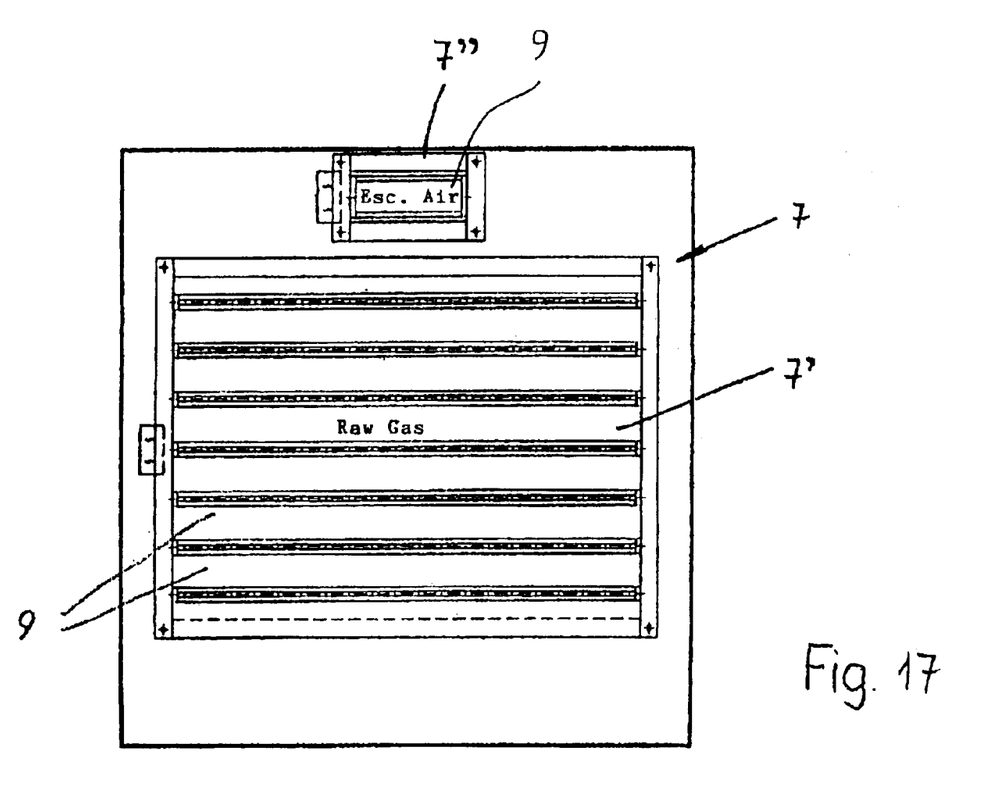
FIG. 17 is an end view of the filter module according to the invention.

The ventilation dampers 9, 10 of the two ventilation damper units 7, 8 are positioned in the closed position tightly adjacent to one another so that no air can pass through them into the respective filter module. FIG. 17 shows in a front view the ventilation damper unit 7 with the two parts 7', 7". The upper part 7" with the single ventilation damper 9 is substantially shorter than the part 7' positioned underneath and provided with several ventilation dampers 9. The two parts 8', 8" of the ventilation damper unit 8 on the backside 4 of the module housing 35 are configured in the same way.

In the adsorption phase the ventilation dampers 9 and 10 of the part 7' and 8" of the two ventilation damper units 7 and 8 are closed (FIG. 5). The ventilation dampers 9, 10 of the parts 7', 8', on the other hand, are open. In this way, the raw gas can flow through the open ventilation dampers 9 of the ventilation damper unit 7 into the module housing 35. Since the terminal lids 13 of the cartridges 11 facing the ventilation damper unit 7 are closed air-tightly, the clean air can flow only between the individual cartridges, as illustrated in FIG. 5 by means of the flow arrows. In the area between the cartridges 11 the raw gas flows radially inwardly into the respective cartridges 11. Upon passing through the ACF material 31, the undesirable components contained in the raw gas are adsorbed. Within the cartridges 11 the gas flows axially and exits the cartridges 11 through the openings of the terminal lids 14. From here the clean gas flows through the opened ventilation dampers 10 of the ventilation damper unit 8 to the exterior.

Figure 11:
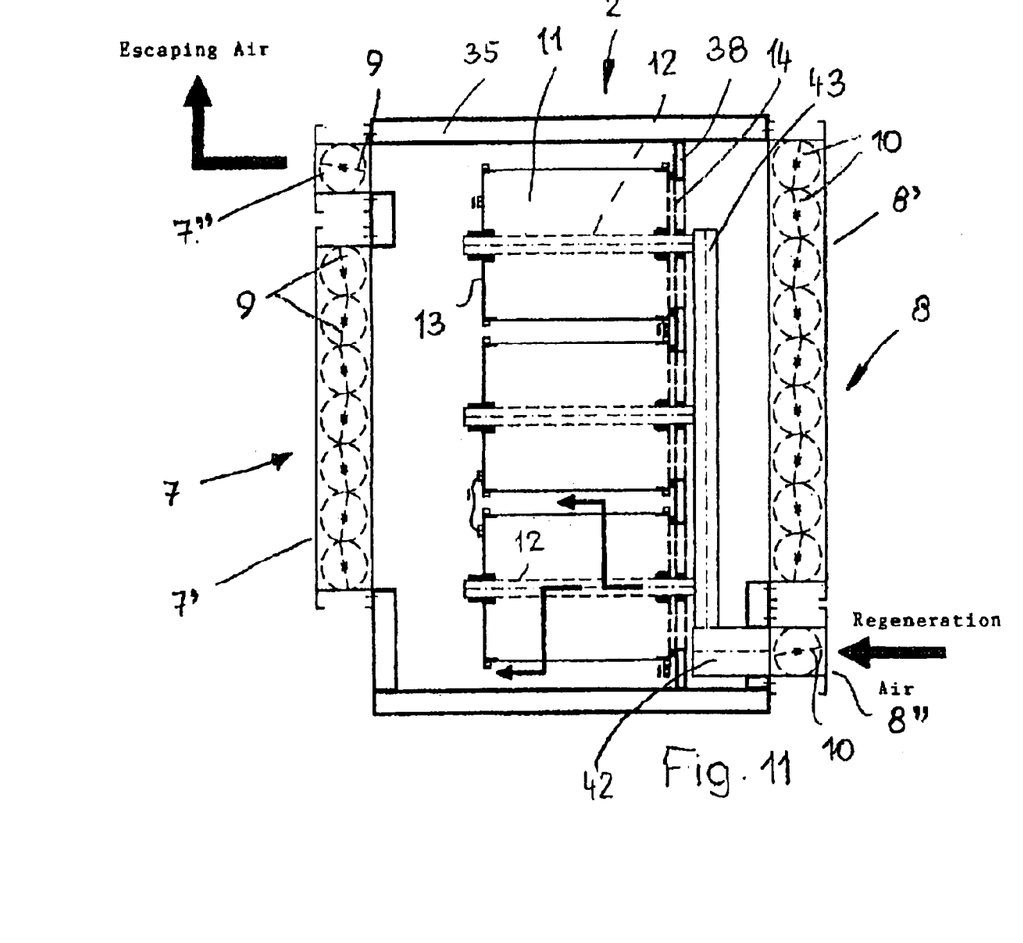
FIG. 11 shows the filter module according to FIG. 5 in the desorption phase.

FIG. 11 shows the filter module 2 according to FIG. 5 in the desorption phase. In this case, the two ventilation dampers units 7, 8 are switched such that the two ventilation dampers 9 and 10 of the parts 7" and 8" of the ventilation dampers units 7, 8 are open (providing an intake) and the ventilation dampers 9, 10 of the parts 7', 8' are closed. Via the open ventilation damper part 8" on the backside 4 of the housing module 35 the regeneration air is taken in. It flows after passing through the open ventilation damper 10 of the part 8" into a channel 42 which extends into close proximity of the partition 38 of the module housing 35 and opens into a distribution line 43. It extends perpendicularly to the axis of the cartridge 11 whose shaft 12 is connected to the distribution line 43. The regeneration air supplied via the ventilation damper part 8" (intake for the regeneration air) flows thus via the channel 42 into the distribution line 43 and from there into the shafts 12. Its other end facing the ventilation damper unit 7 is closed. The regeneration air flows thus in the area between the two terminal lids 13, 14 through the openings of the perforated pipe 12 radially outwardly. In the area between neighboring cartridges 11 the regeneration air, which, upon passing through the ACF material 31, entrains the adsorbed material, flows in the direction of the ventilation damper parts 7" and exits the filter module 2 through its open ventilation dampers 9 (exit for the regeneration air).

Since the shafts 12 of the cartridges 11 extend perpendicularly to the axes of rotation of the ventilation dampers 9, 10, within the filter module 2 an optimal flow of the raw gas or the regeneration air is ensured. The air which exits from the ventilation damper part 7" is guided away as escaping air.

Figures 12, 13:
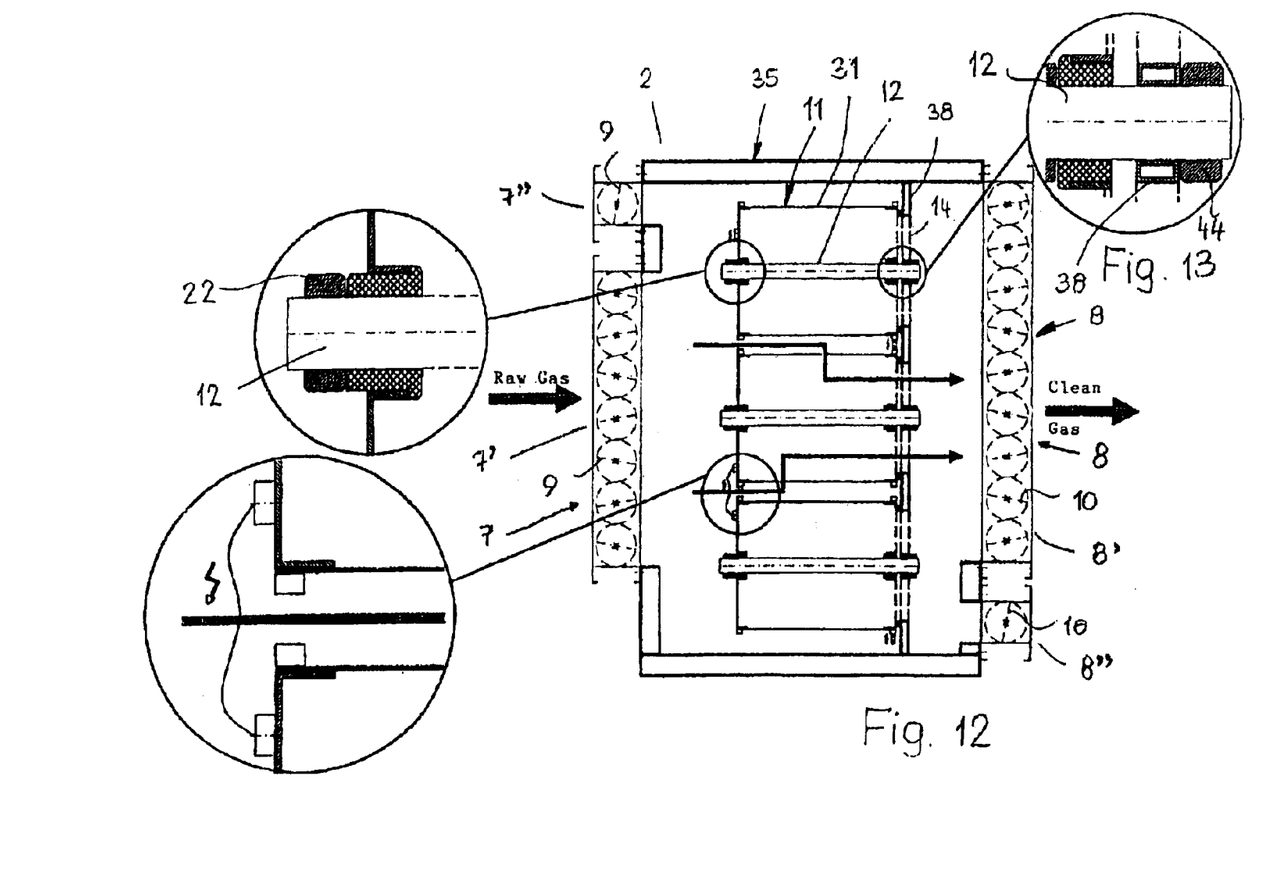
FIG. 12 shows a second embodiment of the filter module according to the invention.
FIG. 13 shows on an enlarged scale the attachment of one end of a shaft of the adsorber according to the invention.
Figure 14:
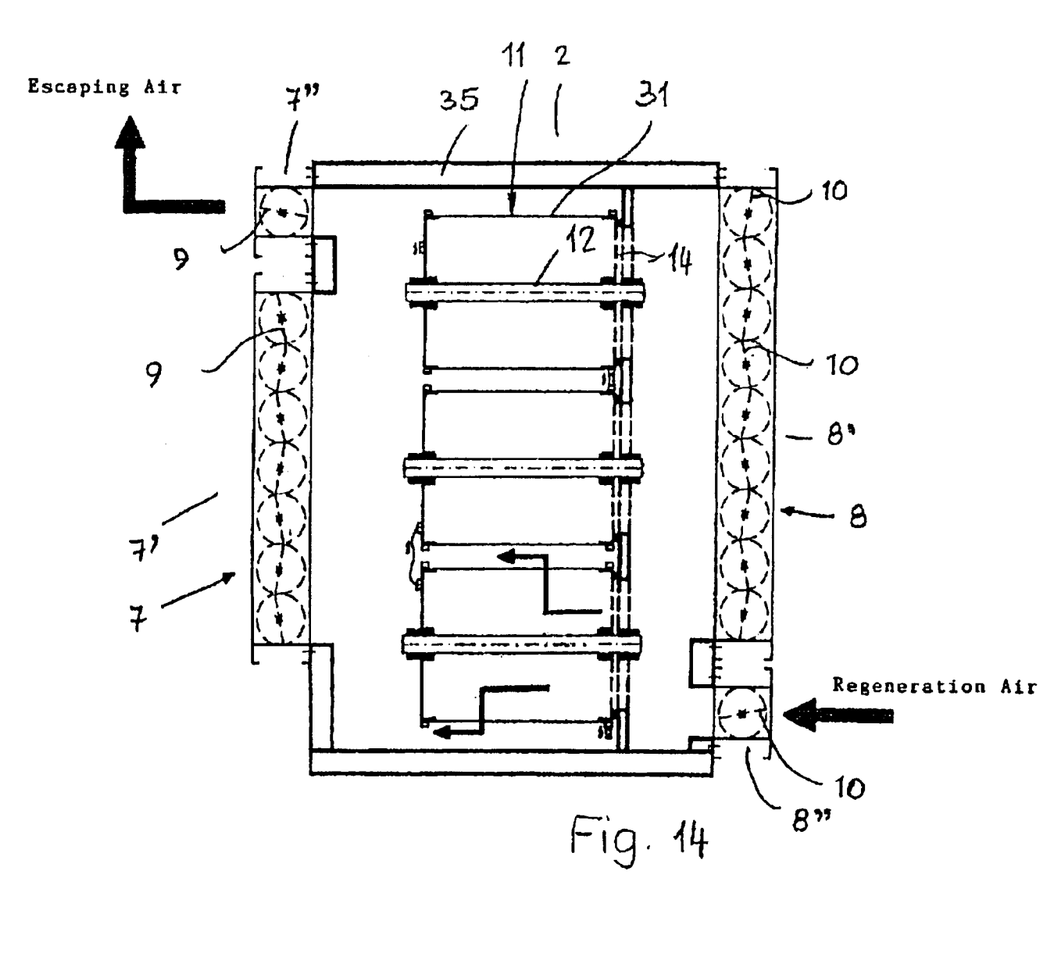
FIG. 14 shows the filter module according to FIG. 12 in the desorption phase.

FIGS. 12 through 14 show an embodiment in which the shafts 12 are embodied as pipes having no through openings.

The end of the shafts 12 facing the ventilation damper unit 8 projects past the partition 38 of the module housing 35. A lock nut 44 is screwed onto this projecting end and rests against the partition 38. Together with the lock nut 22 provided at the other shaft end, the ACF material 31 is tensioned properly in the axial direction. Otherwise, the cartridges 11 are of identical configuration as in the preceding embodiment.

For cleaning the raw gas the ventilation dampers 9, 10 of the parts 7', 8' of the ventilation damper units 7, 8 are open while the two ventilation dampers 9, 10 of the ventilation damper parts 7", 8" are closed. The raw gas thus enters the module housing through the open ventilation dampers 9 of the ventilation damper part 7',then flows between neighboring cartridges 11 axially, and enters the cartridges 11 radially through the ACF material 31. When doing so, the undesirable components are removed from the raw gas and retained in the ACF material 31 in the described way. The clean gas flows then into the area between the shafts 12 and the ACF material 31 axially to the terminal disk 14 and exits through the through openings provided therein. The clean gas exits module housing 35 via the open ventilation dampers 10 of the ventilation damper part 8'.

FIG. 14 shows the filter module 2 according to FIG. 12 in the desorption phase. As in the preceding embodiment, in this case the ventilation dampers 9, 10 of the parts 7',8' of the ventilation damper units 7, 8 are closed while the ventilation dampers 9, 10 of the ventilation damper parts 7", 8" are open. The regeneration air is guided through the ventilation damper part 8" into the module housing 35. In contrast to the preceding embodiment, a line 42, 43 is not provided in the ventilation damper part 8" with which the regeneration air is guided to the individual cartridges 11. The regeneration air flows downstream of the ventilation damper unit 8 to the terminal disks 14 of the cartridges 11 and flows through the through openings provided therein into the respective cartridge. In the area between the shafts 12 and the ACF material 31 the regeneration air flows first axially and then passes through the ACF material 31 radially outwardly. In the area between the individual cartridges the regeneration air now containing the removed components flows to the ventilation damper part 7" and exits as escaping air.

Since the ventilation dampers 9, 10 of the ventilation damper parts 7', 8' in the closed position rest tightly against one another, no air can pass through them from the exterior to the interior nor from the interior to the exterior.

In the illustrated embodiments, the ventilation damper parts 7", 8" are provided with a single ventilation damper 9, 10. However, it is, of course, possible to provide the ventilation damper parts 7", 8" with more than one ventilation damper. In this case, the ventilation dampers, in their closed position, seal the corresponding inlet opening airtightly.

Figure 18:
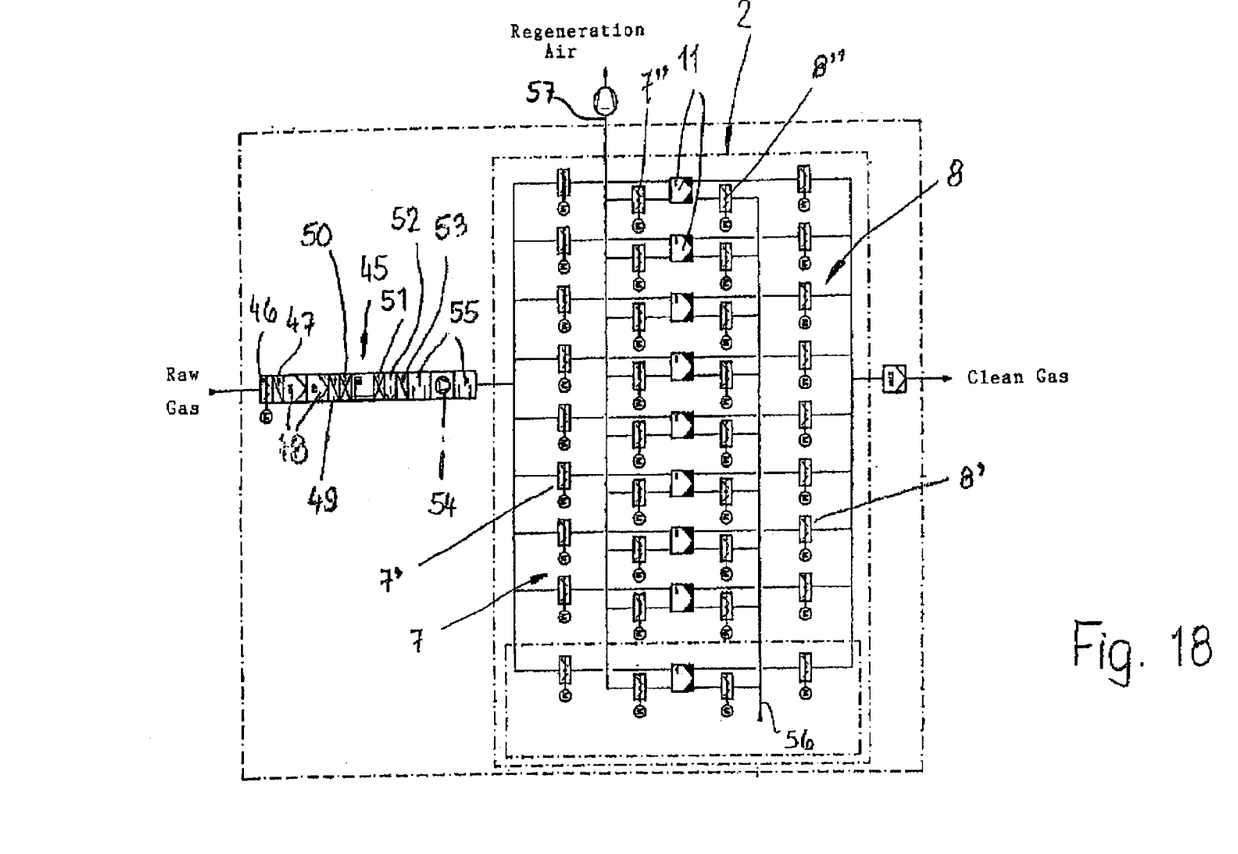
FIG. 18 is a schematic illustration of a device according to the invention for conditioning outer air.

FIG. 18 shows in a schematic illustration a device for conditioning outer air. An outer air device (air intake device) 45 is arranged upstream of the filter module 2, which is comprised, for example, of nine cartridges 11, via which the raw gas (outer air in this case) is supplied to the filter module 2. The configuration of the outer air device 45 is known and is therefore not described in detail in this connection. It is provided at the intake side with a ventilation damper unit 46 which has arranged downstream thereof an air heater 47. Two filters 48, an additional air heater 49, and a cooling unit 5O are arranged downstream of the air heater 47. The raw gas flows within the outer air device 45 also through an additional cooling device 51, a condenser 52, an air heater 53, and a blower 54 before entering the filter module 2. The blower 54 is provided with muffling devices 55 arranged upstream and downstream.

Within the filter module 2 the supplied raw gas is then guided through the cartridges 11 as described in connection with the preceding embodiments and the undesirable components contained in the raw gas are retained in the woven or nonwoven ACF material 31. The cleaned raw gas then exits as clean gas via the ventilation damper unit 8 and reaches the exterior.

Figure 19:
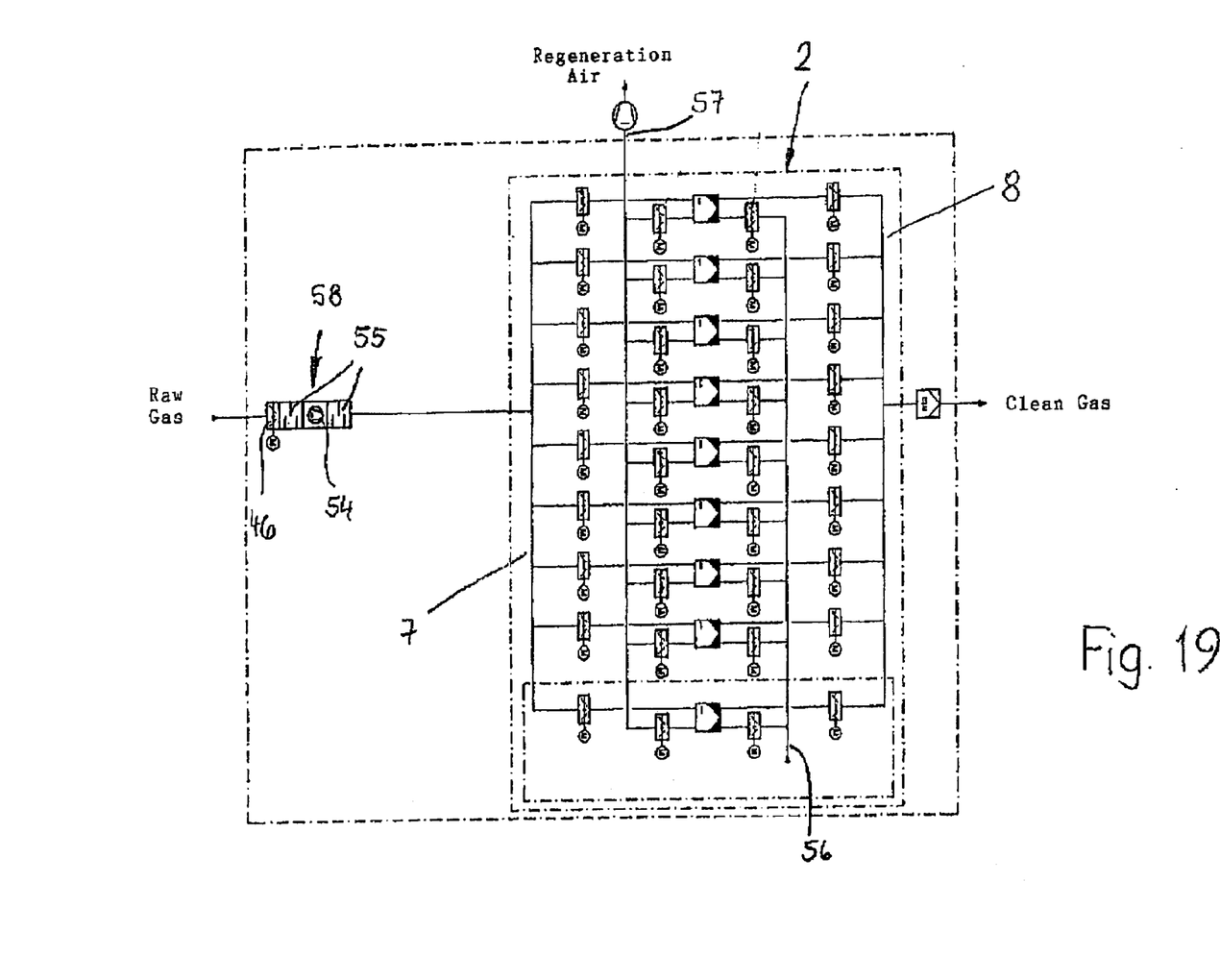
FIG. 19 is a schematic illustration of a device according to the invention for the treatment of escaping air.

FIG. 19 shows a device for treatment of escaping air. The raw gas is supplied via conveying device 58 which is comprised of a ventilation damper unit 46 and the blower 54 having arranged upstream and downstream thereof a muffling device 55, respectively. The raw gas is not conditioned in the conveying device 58 in contrast to exterior or outer air in the device according to FIG. 18. Via the ventilation damper unit 7 the raw gas flows into the filter module 2 in which it is cleaned in the described way by removing the unwanted components. The clean gas obtained in this way flows via the ventilation damper unit 8 at the backside to the exterior. The filter module 2 in other respects is of the same configuration as the one in the embodiment of FIG. 18.

By means of the ventilation damper part 7", 8" the supply of the regeneration air is controlled in the described way. As long as the filter module 2 is in the adsorption phase, the ventilation damper parts 7", 8" are closed. The raw gas flows only via the open ventilation dampers of the ventilation damper parts 7' into the filter module 2 and from there in the described way through the cartridges 11. The clean gas exits via the ventilation damper part 8' and reaches the exterior.

When the cartridges 11 are a to be regenerated, the ventilation dampers of the two ventilation damper parts 7',8' are dosed and the ventilation dampers of the ventilation damper parts 7", 8" are open so that the regeneration air can flow via the intake 56 through the individual cartridges 11 and out through the outlet 57 (FIGS. 18 and 19).

As shown in FIGS. 18 and 19, the air ventilation dampers of the ventilation damper units 7, 8 are motor-driven independently from one another. In this way, it is possible to remove individual cartridges 11 from the absorption process and to regenerate them while the raw gas will continue to flow through the other filter modules 2. In this way it is possible, as has been explained in connection with FIG. 4, to regenerate sequentially the cartridges as needed without interrupting the adsorption process.

As shown in FIGS 18 and 19, the cartridges 11 with the ACF material 31 can be used optimally for external air processing as well as for treating escaping air.

While the specific embodiments of the invention have been shown and described in detail to illustrate the invention principles, it will be understood that the invention may be embodied otherwise departing from such principles.

What is claimed is:

1. An adsorber for cleaning raw gas comprising:
at least one filter element wherein the at least one filter element is comprised of electrically conducting adsorber material;
a support, wherein the adsorber material is wound onto the support;
wherein the support comprises two terminal disks and a shaft on which the two terminal disks are mounted; and
wherein the terminal disks have an angled outer edge to which the adsorber material is fastened.

2. The adsorber according to claim 1, wherein the adsorber material is activated carbon.

3. The adsorber according to claim 1, wherein the adsorber material is a woven ACF material or a non-woven ACF material.

4. The adsorber according to claim 1, wherein the adsorber material surrounds the shaft at a spacing.

5. The adsorber according to claim 1, wherein the adsorber material is axially tensioned.

6. The adsorber according to claim 1, further comprising a clamping ring, wherein the adsorber material is fastened with the clamping ring onto the angled outer edge of the terminal disks.

7. The adsorber according to claim 1, further comprising a carrier comprised of an electrically non conducting, air-transmissive material, wherein the adsorber material is arranged on the carrier.

8. The adsorber according to claim 1, wherein the shaft has at least one through opening for the raw gas between the terminal disks.

9. The adsorber according to claim 1, wherein the first one of the two terminal disks is air-tight.

10. The adsorber according to claim 9, wherein the second one of the two terminal disks is air-permeable.

11. A filter module comprising:
at least one adsorber comprising at least one filter element wherein the at least one filter element is comprised of electrically conducting absorber material;
a module housing having at least one inlet opening for a raw gas entering the filter module and at least one outlet opening for a clean gas exiting the filter module;
a first ventilation damper unit configured to close the at least one inlet opening;
wherein the at least one adsorber is arranged in the module housing:
a second ventilation damper unit configured to close the at least one outlet opening.

12. The filter module according to claim 11, wherein the first and second ventilation damper units comprise at least one ventilation damper, respectively.

13. The filter molecule according to claim 12, wherein the ventilation dampers are adjustable motorically.

14. The filter module according to claim 13, wherein the ventilation dampers are adjustable independently from one another.

15. The filter module according to claim 12, wherein shafts of the adsorbers are positioned perpendicularly to pivot axes of the ventilation dampers.

16. The filter module according to claim 11, having several of the adsorbers arranged in the module housing.

17. The filter module according to claim 16, wherein the adsorbers are positioned parallel to one another.

18. The filter module according to claim 16, wherein the adsorbers are connected electrically conductingly to one another.

19. The filter module according to claim 11, wherein the module housing has at least one intake and at least one exit for regeneration air.

20. The filter module according to claim 19, comprising at least one channel connected to the intake for the regeneration air, wherein the channel is connected to the adsorber.

21. A filter unit comprising at least two filter modules according to claim 11, wherein the filter modules are configured to be switched independently to a regeneration phase.

22. The filter unit according to claim 21, wherein the filter modules have at least one adsorber, respectively, switchable selectively during an adsorption phase into a regeneration phase.

* * * * *